United States Patent

Hartmann et al.

[11] 4,043,297
[45] Aug. 23, 1977

[54] DEVICE FOR THE MAGNETIC ORIENTATION OF MAGNETIC RECORDING MEDIA

[75] Inventors: Job-Werner Hartmann, Ludwigshafen; Roland Falk; Aribert Krug, both of Achern; Georg Huber, Willstaett, all of Germany; Werner Balz, Stoneham, Mass.; Karl Mahler, Kehl, Germany

[73] Assignee: BASF Aktiengesellschaft, Ludwigshafen (Rhine), Germany

[21] Appl. No.: 731,140

[22] Filed: Oct. 12, 1976

Related U.S. Application Data

[62] Division of Ser. No. 523,826, Nov. 14, 1974.

[30] Foreign Application Priority Data

Nov. 17, 1973   Germany .............................. 2357517

[51] Int. Cl.[2] ............................................. B05C 11/00
[52] U.S. Cl. .................................... 118/640; 335/284; 360/135
[58] Field of Search ..................... 118/640; 427/47, 48, 427/49.1, 127–132; 335/284; 360/134, 135; 317/157.5 MR

[56] References Cited

U.S. PATENT DOCUMENTS

| | | | |
|---|---|---|---|
| 2,210,770 | 8/1940 | Ernesti | 317/157.5 MR X |
| 3,021,230 | 2/1962 | Deriaud | 335/284 X |
| 3,162,792 | 12/1964 | Hackley et al. | 360/134 X |
| 3,824,516 | 7/1974 | Benowitz | 335/284 |

Primary Examiner—Morris Kaplan
Attorney, Agent, or Firm—Keil, Thompson & Shurtleff

[57] ABSTRACT

A process and apparatus for producing magnetic discs in which the preferred direction of orientation of the anisotropic magnetic particles, contained in an organic binder system, is tangential to the circumference of the disc. Orientation is effected, prior to solidification of the magnetic layer, by the action of a magnetic field which is formed in the plane of symmetry between at least two pairs of magnetic poles, the poles of each pair being of the same polarity and opposite each other. One pair of poles flares out in cross section toward the plane of symmetry between the pairs of poles, whereas the other pair or pairs of poles of opposite polarity, when viewed in cross section, taper toward the said plane of symmetry to a point, the distance between the poles of such pair(s) being greater than that between the flared poles, and the plane of symmetry of the pairs of poles being in the plane of the disc. Using this process and apparatus, magnetic discs with a non-magnetic metallic base are obtained, in which the anisotropic magnetic particles in the layer of fluid binder applied to the base are oriented tangentially to the circumference of the disc during spin-coating.

2 Claims, 6 Drawing Figures

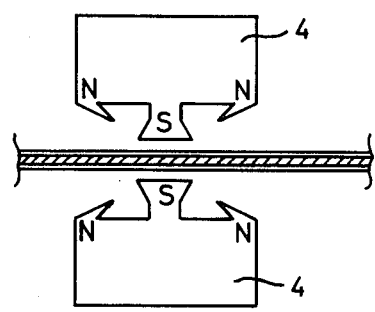
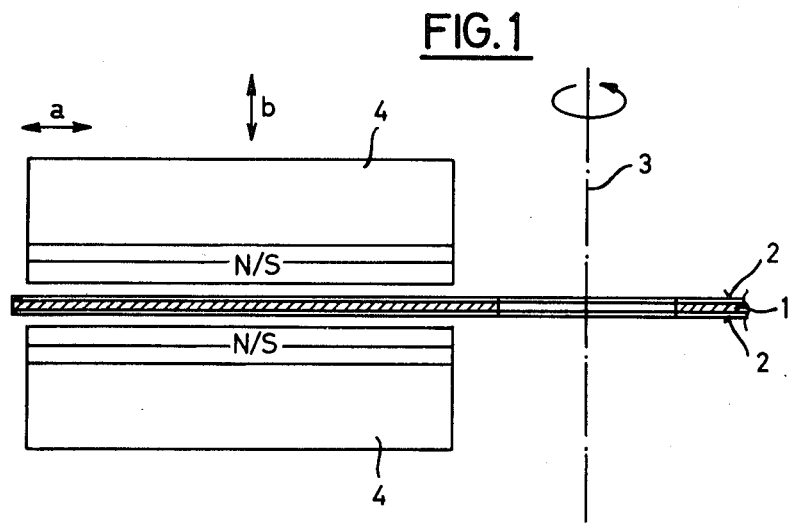

DEVICE FOR THE MAGNETIC ORIENTATION OF MAGNETIC RECORDING MEDIA

This is a division, of application Ser. No. 523,826 filed Nov. 14, 1974.

This application discloses and claims subject matter described in German Patent Application P 23 57 517.9, filed Nov. 17, 1973, which is incorporated herein by reference.

The present invention relates to an apparatus for the manufacture of magnetic recording media comprising flat rigid discs of a non-magnetic metal and a coating, applied to one or both sides thereof, which contains, in a non-magnetic organic binder system, magnetic particles which have been subjected to the action of a magnetic field whilst the coating was still fluid, the said magnetic field being formed between at least two pairs of magnetic poles, the poles of each pair being of the same polarity and opposite each other.

Conventional magnetic media in tape form usually contain gamma-iron(III) oxide, as the magnetic component, finely dispersed in a non-magnetic organic binder. This magnetic pigment/binder mixture is applied to a non-magnetic base and, after hardening, a flexible magnetic coating exhibiting the necessary mechanical strength. The magnetizable medium is then drawn past a suitable transducer to record or reproduce a signal.

It is known (cf. U.S. Pat. No. 2,711,901; French Pat. No. 1,008,218; and Belgian Pat. No. 891,451) that it is advantageous to orient the magnetic axes of the particles, which are usually magnetically anisotropic, so that they lie parallel to the direction of tape motion. It is also known to orient the magnetic particles in such a way that their easy axis of magnetization is parallel to the lines of force of the magnetic field created by the transducer and corresponding to the signal (U.S. Pat. No. 3,052,567).

Nowadays most recording media are manufactured by applying a layer of a dispersion of magnetic particles in a binder system in the desired thickness to a base and then passing the base with the applied layer, which is still fluid, immediately past a magnetic field of suitable configuration. This procedure applies to all magnetic recording media in tape form. However, if the recording medium is disc-shaped and if the recording direction is also circular, it can no longer be employed.

It is known from German Published Application No. 2,304,311 that this problem can be solved by orienting the magnetically anisotropic particles, contained in the layer of fluid binder mixture applied to a flexible base in the form of a web, by means of a circular magnetic field, and then immediately solidifying the applied layer. After drying, circular flexible recording discs are then stamped out of the broad strip of material.

However, all these processes are only applicable to nonmagnetic base materials. If, in the production of magnetic recording media, the base mterial is continuously passed through the orienting field, it should not be conductive either.

In present-day electronic data processing, peripheral storage devices, such as disc memories, of increasingly higher performance are employed in order to process major quantities of data in ever shorter periods of time. These memories comprise one or more magnetic discs, either permanently installed in a drive unit or in the form of readily exchangeable disc packs. The data are usually stored by appropriate magnetization of the magnetic layer applied to a circular aluminum disc, both sides of the disc usually being coated and magnetized. Magnetization, and hence data transfer, is effected by means of magnetic heads which, for example, are guided over each side of the disc from the outside. Magnetization, and the reproducible reading of the data is effected in numerous concentric tracks of a given width on the magnetic discs which rotate under the write-and-read heads. At a constant speed of rotation the peripheral speed varies proportionately to the circumference of the concentric tracks. As a result at a constant bit density the signal amplitude on the inner recording tracks is reduced. To avoid this, a variation of the spin-coating process is employed which gives a magnetic layer which gradually decreases in thickness toward the circumference of the discs, this thickness profile being preserved by hardening the layer during the spin-coating operation (cf. U.S. Pat. No. 2,913,246). Attempts to improve the recording sensitivity of such magnetic discs by orientation of the anisotropic magnetic materials, using the measures known for non-conducting base materials, have proved unsuccessful. As a result of the speed at which the disc rotates during the spin-coating process, an eddy-current braking effect is produced when conventional orientation fields are employed. This interferes with the speed program employed in the spin-coating process, producing an unsuitable thickness profile in the magnetic coating. For this reason one has hitherto had to be satisfied with the properties of magnetically non-oriented coatings.

An object of the invention is to provide an apparatus for the manufacture of recording media in the form of flat discs, in which it is possible, despite the use of a rigid metallic base material, to magnetically orient the anisotropic magnetic particles, contained in the fluid layer of binder applied to the base, during the spin-coating process so that the preferred direction of particle orientation is tangential to the circumference of the disc, the applied layer being hardened after the spin-coating operation. A further object of the invention is to provide the necessary orienting apparatus.

We have now found that the production of magnetic recording media comprising flat rigid discs of a non-magnetic metal and a coating, applied to one or both sides thereof, which contains magnetically anisotropic particles in a hardenable binder system, by applying the fluid coating mixture by spin-coating and converting the coating into a firm hard magnetic layer of predetermined thickness by drying, curing and subsequently grinding and polishing the magnetic layer, can be advantageously carried out by exposing the coating, during application and/or hardening thereof, to a magnetic field which is formed in the plane of symmetry between at least two pairs of magnetic poles, the poles of each pair being of the same polarity and opposite each other, one pair of poles flairing out in cross section toward the plane of symmetry between the pairs of poles, whereas the other pair or pairs of poles, of opposite polarity when viewed in cross section, taper toward the said plane of symmetry to a point, the distance between the tapered poles being greater than that between the flared poles, and the plane of symmetry of the pairs of poles lying in the plane of the disc.

The rigid disc-shaped recording media carrying a magnetic coating in which, in accordance with the process of the invention, the magnetically anisotropic particles are orientated tangentially to the circumference of the disc, are manufactured, for example, by spraying the fluid coating mixture onto a rotating nonmagnetic metallic base discs of conventional size and thickness, especially a disc of aluminum or aluminum alloy. A very advantageous method has proved to be first to apply a layer of magnetic dispersion approximately from 1 to 3 mm thick to the slowly rotating base disc, for example at a speed of from about 100 to 500 r.p.m., and then to produce a coating of the desired thickness by rotating the disc at a higher speed, preferably at about 1,000 to 3,000 r.p.m. coating methods which can be employed are described, for example, in U.S. Pat. No. 2,913,246 and U.S. Pat. No. 3,198,657.

The magnetically anisotropic particles can be oriented tangentially to the circumference of the disc in spite of the metal disc rotating, without an eddy-current braking effect being produced.

To carry out the process according to the apparatus of the invention, a magnet comprising at least two pairs of opposed poles is used, these cooperate radially with both sides of the base disc carrying the coating, which is still fluid. One pair of poles flares out in cross section toward the plane of symmetry between the pairs of poles, whereas the other pair or pairs of poles of opposite polarity, when viewed in cross-section, taper toward the said plane of symmetry to a point and terminate at a greater distance from this plane than the pair of flared poles.

Embodiments of the magnetic orienting device according to the invention will now be described with reference to the accompanying drawings, wherein:

FIG. 1 is a side view, partially in cross section, of the base disc and one embodiment of the orienting mgnets;

FIG. 2 is an end view, partially in cross section, of the base disc and the orienting magnets of FIG. 1;

Figure 3A:
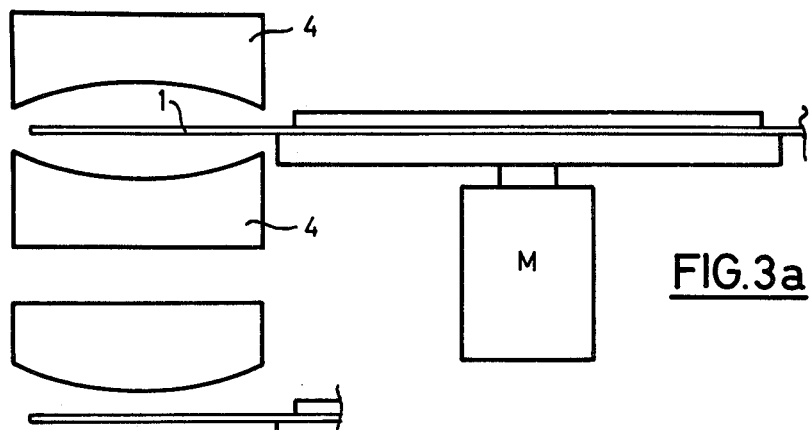
FIGS. 3a to 3d are schematic side views of the base discs as well as its driving elements and of other embodiments of the orienting magnets, the configurations, as so viewed, of the magnets of these other embodiments differing from that shown in FIG. 1. More particularly.
Figure 3B:
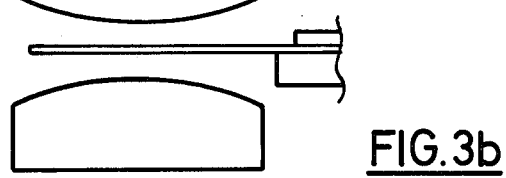
Figure 3C:
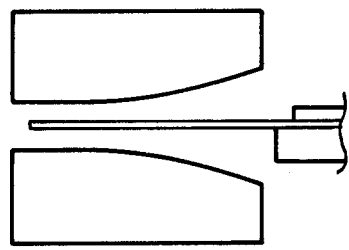
Figure 3D:
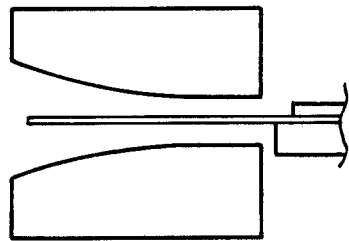

In FIG. 3a the pole faces of the magnets in side view are of symmetrically concave configuration;

In FIG. 3b the pole faces of the magnets in side view are of symmetrically convex configuration;

In FIG. 3c the pole faces of the magnets in side view are of semi-convex configuration, namely so that the pole faces of the two magnets are closer to each other opposite a radially outer portion of the disc than a radially inner portion of the disc;

In FIG. 3d the pole faces of the magnets in side view are of semi-convex configuration, namely in such a way that the pole faces of the two magnets are closer to each other opposite a radially inner portion of the disc than a radially outer portion of the disc.

An advantageous embodiment of such an orienting magnet is shown in FIG. 1. The base disc 1 carrying the coating 2 rotates about the axis 3 both during the coating operation and during the hardening step. To achieve orientation of the anisotropic magnetic particles in a direction tangential to the circumference of the disc, the magnets 4 are moved backwards and forwards radially in the direction indicated by double arrows $a$ between the periphery of the disc and its center in such a way that the disc is always situated in the plane of symmetry between the magnets during the hardening step. To obtain a particular field strength, it has provided advantageous to so design the holding means for the opposed pairs of poles that the latter can be moved symmetrically with respect to the plane of the disc in the directions indicated by double arrow $b$.

An end view partly in cross-section, of the disc and of the orienting magnets 4 is shown in FIG. 2. This is a view taken along the line $a$ in FIG. 1, i.e. radially to the axis of rotation 3 of the magnetic disc. While in FIG. 2 the magnets themselves are shown in end view, it will be appreciated that the outline of the magnets would be the same if, instead, the cross-section in FIG. 2 had been taken through the disc and the two magnets as well.

It has proved expedient to move the magnets 4 symmetrically from a remote position toward the disc 1 and then to move them away again, as shown in FIG. 1 (cf. double arrow, $b$).

It is immaterial for the invention whether the orienting magnets are permanent magnets or electromagnets. Magnetic memory discs in which the magnetic particles are oriented tangentially to the circumference of the disc, i.e. in a direction in which their residual induction in the recording direction is greater than at right angles thereto, have a higher sensitivity during recording and consequently a higher output during reproduction. The recording density can easily be increased without there being any need to take additional special measures since the demagnetization factor in the recording direction is greatly reduced. The advantages of orienting the magnetic particles of magnetic recording media are known from magnetic recording media using non-metallic base materials. The process according to the invention now makes it possible for these advantages to be realized in the case of metallic magnetic discs, which are produced by spin-coating to obtain the requisite thickness profile and/or a uniform surface and subsequent hardening of the applied magnetic coating.

While developing the apparatus accoring to the invention we found that it is possible to vary the orientation ratio, i.e. the ratio of the residual induction in the tangetial direction to that in the radial direction, along the radius. For this purpose, the distances between the opposed poles along the plane of symmetry in the disc 1 are advantageously varied. FIGS. 3a – d show various embodiments of this. If disc-shaped magnetic recording media are oriented in this way, a differing degree of orientation of the particles along the radius can be advantageously employed, without varying the thickness of the magnetic coating, to achieve a constant sensitivity during recording and reproduction which is not affected by the different speeds of the innermost and outermost tracks.

It is possible with the apparatus according to the invention to manufacture magnetic discs in a simple manner which have a higher sensitivity during recording and reproduction than prior art magnetic recording media of this type and hence exhibit very high recording densities, this being achieved without changing the composition of the magnetic layer, i.e. without having to take special procedural steps.

A further advantage offered by the invention is that an additional parameter is introduced into the coating operation which is dependent on the rheologocal properties of the coating mixture used, which parameter enables the manufacturing process to be further optimized.

The following Examples in which parts and percentages mentioned are by weight, unless stated otherwise, further illustrate the apparatus the invention.

EXAMPLE 1

1.9 mm thick aluminum base discs having a diameter of 353 mm, the diameter of the central hole being 164 mm, are lapped and then spin-coated with a non-magnetic intermediate layer having the composition given below, so that after baking at 200° C for 2 hours, a coating of from about 6 to 8 μ in thickness is obtained:

16.94 parts of iron oxide red used for polishing; 0.25 part of a siliconized epoxy resin; 8.08 parts of a 50% strength solution of a condensation product of epichlorhydrin and bisphenol A in ethylene glycol acetate; and 12.00 parts of a solvent mixture of equal parts of ethylene glycol acetate, cyclohexanone and dimethylformamide are dispersed for 26 hours in a steel ball mill. Toward the end of this treatment, 2.60 parts of trimethoxymethylene phenol, 3.76 parts of the above epoxy resin solution and 3.46 parts of a paste consisting of ⅓ fused alumina powder, ⅓ ethylene glycol acetate and ⅓ of the said epoxy resin are added.

The aluminum discs which have thus been provided with an intermediate layer are ground and polished, so that the peak-to-valley height is from 0.05 to 0.1 μ. The discs are then spin-coated with a magnetic dispersion according to U.S. Pat. No. 3,622,386 and baked for 30 minutes at 200° C.

The discs are coated on a device according to German Pat. No. 2,157,650 and German Utility Model No. 7,216,482, and, during the application of the fluid dispersion to the two sides A and B of the disc, the rotating disc is exposed to the magnetic field created by the magnets shown in FIG. 2. Some further discs are coated without exposure to the said magnetic field for the purposes of comparison. After oven-drying, the magnetic discs are ground and polished to a peak-to-valley height of 0.15 μ. The discs are recorded on a conventional memory drive unit employing a flying heat at 3,600 r.p.m. using two different recording frequencies, namely 1.612 mc/s and 3.224 mc/s, the write current on the track 17.1 cm from the center of the disc being 160 ma and that on the track 14.4 cm from the disc center being 130 ma. Results:

The read voltages, in mv, are given in the following Table:

|  | Side A | | | | Side B | | | |
| --- | --- | --- | --- | --- | --- | --- | --- | --- |
|  | 17 cm track | | 14 cm track | | 17 cm track | | 14 cm track | |
|  | 1.6 mc/s | 3.2 mc/s | 1.6 mc/s | 3.2 mc/s | 1.6 mc/s | 3.2 mc/s | 1.6 mc/s | 3.2 mc/s |
| Comparison product | 3.1 | 2.4 | 1.4 | 1 | 3.2 | 2.4 | 1.6 | 1.1 |
| Magnetic disc according to the invention | 4.5 | 3.2 | 1.9 | 1.2 | 4.6 | 3.2 | 2 | 1.2 |

The Table shows a substantial improvement in the read voltages, for the same write currents, in the case of the data disc according to the invention.

EXAMPLE 2

Aluminum base discs 1.2 mm thick but otherwise the same as in Example 1 are coated on both sides with an approx. 0.001 mm thick layer of aluminum oxide. The discs are then coated with a magnetic dispersion exactly as described in Example 1. The magnetic layers obtained after spinning and oven-drying (200° C, 2 hours), are 4–5 μ thick. In the case of some of the discs, the magnetic field created by the magnets shown in FIGS. 1 and 2 is applied to the discs during the coating process, pair of flared poles being 6 mm apart. After spinning the disc at high speed for about 20 seconds, to obtain the necessary thickness profile, the pairs of magnetic poles are moved away from the disc at a continuous rate at high angles to the plane of the disc, the distance between the pair of flared poles being 50 mm after 10 seconds. The disc is then taken from the apparatus and subjected to the conventional grinding and polishing steps.

The magnetic disc is run at 2,400 r.p.m. on a commercially available memory drive unit employing a flying head. The signals are recorded at a write current of 70 ma on both sides of the disc, in each case on an inner track and an outer track, recording frequencies of 1.25 mc/s and 2.5 mc/s being used in each case.

A magnetic disc oriented during spin-coating with the magnets according to the invention exhibit the read voltages (signal levels) in mv given in the Table below. The values obtained with a magnetic disc produced in the same way but without the use of the magnets according to the invention, and with a commercially available magnetic disc of the same type, are given for comparison.

|  | Side A | | | | Side B | | | |
| --- | --- | --- | --- | --- | --- | --- | --- | --- |
|  | Outer track | | Inner track | | Outer track | | Inner track | |
|  | 1.25 mc/s | 2.5 mc/s | 1.25 mc/s | 2.5 mc/s | 1.25 mc/s | 2.5 mc/s | 1.25 mc/s | 2.5 mc/s |
| Magnetic disc according to the invention | 10.8 | 11.2 | 5.5 | 4.0 | 10.2 | 10.8 | 5.4 | 3.7 |
| Comparison product | 7.2 | 8.0 | 4.5 | 3.6 | 6.6 | 7.0 | 4.1 | 3.2 |
| Commercially available magnetic disc | 7.6 | 7.6 | 5.0 | 3.2 | 7.4 | 7.4 | 4.4 | 2.6 |

These results show that the apparatus of the invention gives improvements in the signal level of from 10 to 50%.

We claim:

1. An apparatus for the manufacture of magnetic recording media comprising flat rigid discs of a non-magnetic metal and a coating, applied to one or both sides thereof, wherein at least two pairs of magnetic poles are arranged symmetrically opposite one another, one pair of poles flaring out in cross section toward the plane of symmetry between the pairs of poles, whereas the other pair of pairs of poles of opposite polarity, when viewed in cross section, taper toward the said plane of symmetry to a point and are spaced further apart than the flared poles.

2. An apparatus as claimed in claim 1, wherein the pairs of magnetic poles can be moved parallel and at right angles to the plane of symmetry.

* * * * *